UNITED STATES PATENT OFFICE.

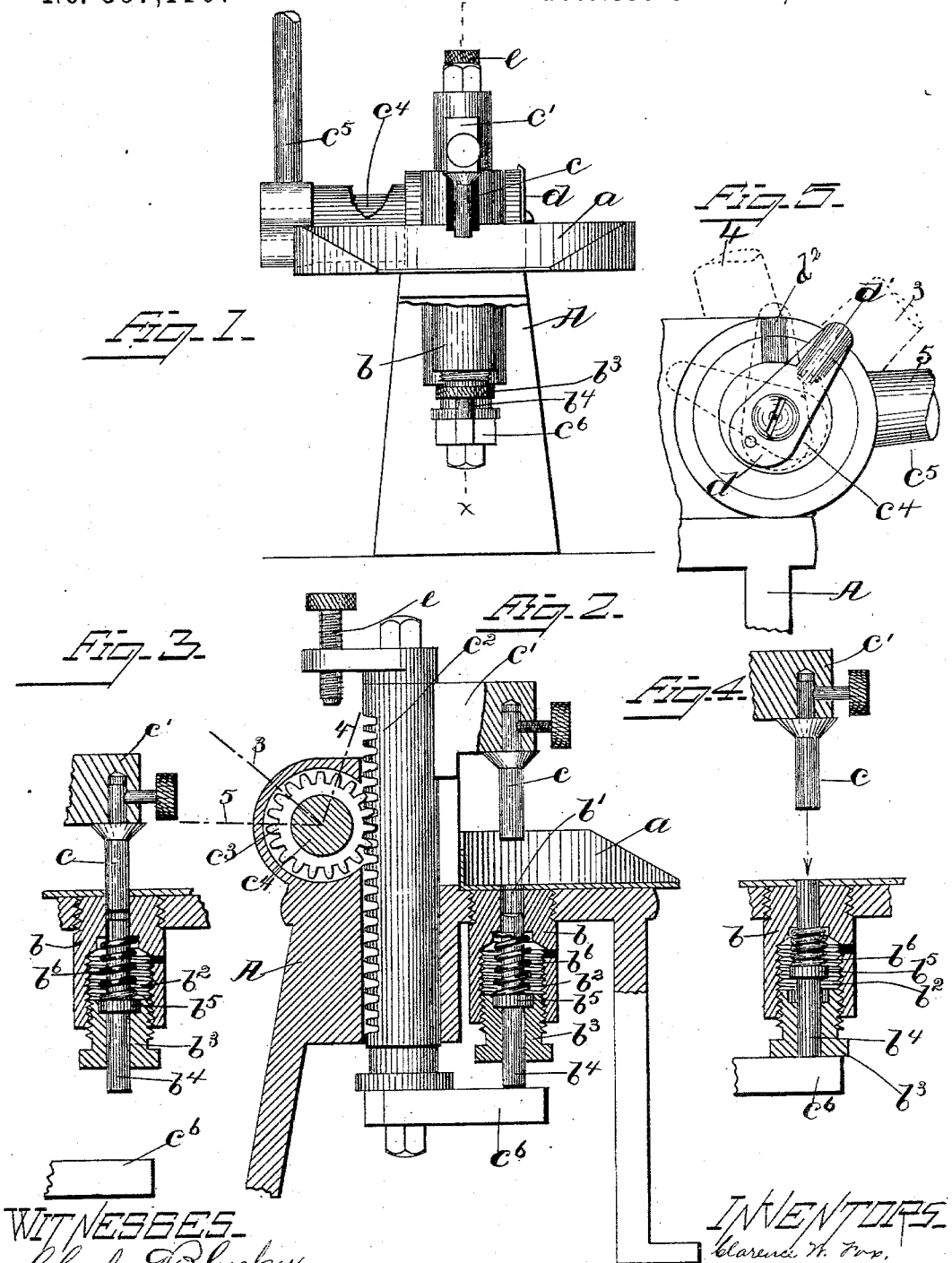

CLARENCE W. FOX, OF SAUGUS, JOHN G. BLOUNT, OF EVERETT, AND BERNICE J. NOYES, OF BOSTON, MASSACHUSETTS; SAID NOYES AND BLOUNT ASSIGNORS TO SAID FOX.

MACHINE FOR MAKING TABLETS, PILLS, &c.

SPECIFICATION forming part of Letters Patent No. 597,110, dated January 11, 1898.

Application filed August 30, 1894. Serial No. 521,765. (No model.)

*To all whom it may concern:*

Be it known that we, CLARENCE W. FOX, of Saugus, county of Essex, JOHN G. BLOUNT, of Everett, county of Middlesex, and BERNICE J. NOYES, of Boston, county of Suffolk, in the State of Massachusetts, have invented an Improvement in Machines for Making Tablets, Pills, &c., of which the following description, in connection with the accompanying drawings, is a specification, like letters on the drawings representing like parts.

This invention has for its object to improve and simplify the construction of machines for making tablets, pills, &c., being especially designed for the use of druggists in filling small prescriptions of various kinds.

In accordance with this invention a die composed of a die-block having a hole through it from top to bottom and containing a suitable bottom piece is employed, and a powder-containing and tablet-receiving pan of suitable dimensions and having a hole through it is stationarily supported with relation to the die, the parts being so arranged that the die opens directly into the pan in order that the powder or other material which may be placed in the pan—as, for instance, in the right-hand end or portion thereof—may be fed or pushed into the die with a spatula or other convenient tool, and the compressed tablet may be poked from the die into the opposite end or portion of said pan. Such a method of feeding the material into the die obviates the necessity of providing special automatic feeding devices which require a great deal of care and attention and which are very expensive, and such a receiver for the compressed tablets offers many advantages.

The die-block is made detachable from its support in order that different sizes may be substituted, and the bottom piece is preferably made vertically adjustable to vary the depth of the recess and thereby the size of the tablet. For simplicity the bottom piece is also used as an ejector, suitable means being provided for moving it to accomplish this result.

A plunger is provided having a suitable hand-operated mechanism, by means of which it is caused to descend and compress the material contained in the die, and thereafter ascend in order that the tablet formed in the die may be ejected and the die refilled, and this plunger is also detachably connected with its support that different sizes may be substituted as required.

Figure 1 shows in front elevation a machine for compressing tablets, pills, &c., embodying this invention; Fig. 2, a vertical section of the machine shown in Fig. 1, taken on the dotted line $xx$; and Figs. 3, 4, and 5, details to be referred to.

The main framework A is of suitable shape and construction to support the operating parts and has as a part of it a table. Upon the table is secured in horizontal position a suitably-shaped pan $a$ to receive the material of which the tablets, pills, or other articles are to be made and also to receive the compressed articles, said pan having a hole through it. This pan consists of a large flat plate, oblong in shape and having an upwardly-extended marginal flange or rim extending along the rear side and ends, being cut away at the front for convenience in operating the spatula and to remove the compressed tablets. A hole is made through the table directly beneath the hole in the pan, thereby registering with it, it being interiorly screw-threaded.

A die-block $b$ is screwed up into the hole in the table, although it may be otherwise secured to or supported by the frame, and is thus stationarily supported with relation to the power-containing and tablet-receiving pan, and said die-block has a hole through it from top to bottom in line with the hole through the pan. The upper part or end portion $b'$ of the hole through the die-block is made of a diameter or shape that may be desired for the tablet to be formed, while the lower part or end $b^2$ of said hole is reamed out considerably larger in diameter than the part $b'$ and is internally screw-threaded to receive a nut $b^3$. A bottom piece $b^4$ is constructed to fit and slide freely vertically in a hole formed centrally through the nut $b^3$, the upper end of said bottom piece being shaped to fit and slide freely in the hole $b'$ of the die-block and serving as the bottom of the die or recess in which the tablet is formed or compressed. The bottom piece $b^4$ has formed on it a flange $b^5$, which rests upon or against the inner end of the nut $b^3$, said nut preferably being recessed to receive said flange, so that the bottom piece is supported by said nut. By adjusting the nut $b^3$ the bottom piece will be raised or lowered to vary the depth of the hole or recess in which the tablet is formed. A spiral spring $b^6$ encircles the bottom piece at a part thereof within the die-block $b$, the upper end of which bears against a shoulder formed in said die-block at the junction of the holes $b'$ $b^2$ and the lower end of which bears against the flange $b^5$, the tendency of said spring being to force the bottom piece down.

The bottom piece, in addition to being adjustable in the manner above described, is also movable vertically against the pressure of the spring $b^6$ to eject the compressed tablet, rising for the accomplishment of this result until its upper end is substantially flush with the bottom of the pan $a$.

A plunger $c$ of a diameter or shape to fit the hole $b'$ in the die-block is detachably or adjustably secured to a vertically-movable head or arm $c'$, projecting from a bar $c^2$, which has its bearings in and extends down through the framework. The bar is made as a rack, having formed upon it a series of teeth which are engaged by a pinion $c^3$, secured to a horizontal shaft $c^4$, which has attached to it at one end a hand-lever $c^5$, by means of which it may be turned. This hand-operated mechanism for the plunger $c$ is also designed to operate the bottom piece $b^4$ for the purpose of ejecting the compressed tablet, and to accomplish this result an arm or finger $c^6$ is secured to the lower end of the bar $c^2$, projecting beneath and beyond the bottom piece, so that when the bar $c^2$ is raised it will strike the lower end of said bottom piece and raise it.

In operating the machine there are three different positions which the parts thereof assume.

In Figs. 1 and 2 the parts are in the position that they will occupy for filling the die preparatory to compressing the tablet, and when in this position the hand-lever occupies the position represented by the dotted line 3, Figs. 2 and 5, the plunger $c$ is elevated sufficiently to enable the material to be pushed into the die or recess beneath it, and the bottom piece $b^4$ is in its lowermost position.

In Fig. 3 the hand-lever has been turned to the position represented by dotted line 4, Figs. 2 and 5, but the only material change in the relative positions of the parts is represented by the plunger $c$, which has descended into the hole $b'$ to compress the material contained therein, such descent of the plunger being limited by the limiting-stop $e$ at the upper end of the bar $c^2$ striking upon the frame.

In Fig. 4 the hand-lever has been turned backward into the dotted-line position 5, Fig. 2, (see full lines, Fig. 5,) the plunger $c$ thereby raised, and the bottom piece $b^4$ also raised to eject the tablet by the action of the finger $c^6$ upon it.

To assist the inexperienced user in determining when he has turned the hand-lever a sufficient distance, a spring-acting finger $d$ is secured to the end of the shaft $c^4$, bearing against the end of the box or bearing in which said shaft turns, it having upon its contacting face a projection $d'$, and in said end of the box or bearing of the shaft a single recess $d^2$ is formed which receives the projection $d'$ of the finger $d$ as the shaft is turned. Any other flat surface having a single recess may be employed in lieu of the end of the box or bearing.

The recess $d^2$ is located to indicate the intermediate position of the hand-lever—that is, the position it should occupy when the bottom piece $b^4$ is in its lowermost position for filling or feeding the material to the die—and the user can easily determine when the hand-lever is in this position by the sudden diminution of the friction exerted on the lever by the pressure of the finger $d$ against the bearing. The two extreme positions of the hand-lever are indicated by the stop $e$ striking the frame when compressing the material and by the finger $c^6$ striking the nut $b^3$ when ejecting the compressed tablet. These three operations may be carried on successively and rapidly, the material being fed at the proper time and the tablets or other articles compressed and ejected.

By differently forming or shaping the die the shape of the articles produced may be changed at will.

In working the machine the material is placed in one end of the pan $a$ and is fed into the recess in the die-block by means of a spatula. The material so fed into the recess is then compressed and then ejected, and the compressed tablet is poked off the die into the opposite end of the pan. The pan being in a plane with the top of the die the material is easily fed into the die, and the compressed tablet is pushed along out of the way without liability of breaking, and any material which may crumble off of the compressed tablet is easily used over again.

It will be observed that one of the essential features of this invention is the simple yet efficient manner of feeding the material to the die—i. e., pushing it from a pan into the die by means of a spatula or other hand-tool and receiving and holding the compressed tablets while a number are being formed—and we desire it to be understood that any construction or arrangement of powder-containing and tablet-receiving pan and die stationarily supported one with relation to the other, whereby the die opens directly into the pan to receive the material contained in said pan in the manner herein provided, comes within the scope of this invention.

We claim—

1. In a machine for forming tablets and other articles, a die-block having a hole through it from top to bottom, a powder-receiving pan stationarily supported with relation thereto also having a hole through it, whereby the die-block is in open communication with the pan, a spring-pressed bottom piece in said die-block, means for raising it to eject a compressed tablet, a plunger and means for operating it to compress the material, substantially as described.

2. In a machine for forming tablets and other articles, the combination of a fixed pan to receive the material, a die-block, the top of which lies substantially flush with the bottom of the pan, that the material may be pushed thereinto by a hand-tool, a movable rod entering the opening in said die-block and serving as a bottom piece, having a collar $b^5$, the spring $b^6$, and nut $b^3$, a plunger to compress the material, and means for operating it and also for raising the bottom piece against the stress of the spring $b^6$ to eject the compressed tablet, substantially as described.

3. In a machine for forming tablets and other articles, the combination of a pan to receive the material, die-block $b$ screwed up into the bottom of the pan, a rod $b^4$ movable vertically in the die-block and forming the bottom of the die, having collar $b^5$, the spring $b^6$, nut $b^3$ screwed up in the die-block $b$, the lower end of said rod $b^4$ projecting through the nut $b^3$, the vertically-movable rack-bar $c^2$ having a lateral projection $c'$ at its upper end carrying plunger $c$, and having a lateral projection $c^6$ at its lower end, and means for moving the bar $c^2$ to compress and eject the tablet, substantially as described.

4. In a machine for forming tablets and other articles, the combination of a die having a movable bottom piece, a plunger to compress the material in said die, a hand-lever, and mechanism actuated by it for operating the plunger and raising the movable bottom piece of the die, the two operations being carried on successively to thereby compress the material and thereafter eject the compressed tablet, a stop to limit the descent of the plunger, and a stop to limit the ascent of the movable bottom piece, substantially as described.

5. In a machine for forming tablets and other articles, the combination of a die having a movable bottom piece, a plunger to compress the material in said die, a vertically-movable rack-bar to which said plunger is attached, pinion engaging it and hand-lever for turning said pinion, a projection $c^6$ on said rack-bar for raising the aforesaid movable bottom piece upon the ascent of the plunger, a spring-acting finger $d$ on the shaft of the hand-lever bearing upon the flat surface and having a projection $d'$ adapted to enter the recess formed in said flat surface when the parts are in their intermediate position for filling, substantially as described.

6. In a machine for forming tablets and other articles, the combination of the die-block $b$ having a central hole $b'$, $b^2$, through it, nut $b^3$, bottom piece $b^4$ supported by it, a spring $b^6$ acting upon said bottom piece, the lower end of said bottom piece projecting down through the nut $b^3$, a plunger, a rack-bar supporting it, and means for reciprocating said rack-bar vertically, a finger $c^6$ secured to the lower end of said rack-bar projecting beyond the lower projecting end of the bottom piece, substantially as described.

7. In a machine for forming tablets and other articles, the combination of a supporting-frame, a plunger, and means for operating it, a removable die-block $b$ supported by said frame having supported by and removable with it a bottom piece $b^4$, which is movable independently of its support to eject the compressed tablet, substantially as described.

8. In a machine for forming tablets and other articles, the combination of a supporting-frame, a plunger, and means for operating it, a removable die-block $b$ supported by said frame having supported by and removable with it a bottom piece $b^4$, which is movable independently of its support to eject the compressed tablet, and also adjustable to vary the depth of the recess, substantially as described.

9. In a machine for forming tablets and other articles, the combination with a supporting-frame, a plunger, and means for operating it, of a removable die-block $b$ supported by the frame having a recess $b'$, a bottom piece $b^4$ for said recess, and an adjusting-nut $b^3$ screwed into said removable die-block $b$ for adjusting said bottom piece $b^4$ to thereby vary the depth of the recess, substantially as described.

10. In a machine for forming tablets and other articles, the combination with a supporting-frame, a plunger and means for operating it, of a removable die-block $b$, supported by the frame, having a recess $b'$, a bottom piece $b^4$ adjustable in said recess to vary its depth, and also movable to eject the compressed tablet, an adjusting-nut $b^3$ screwed into said die-block $b$, for adjusting said bottom piece $b^4$, and means for raising said bottom piece independently of the adjusting-nut to eject the compressed tablet, substantially as described.

11. In a machine for forming tablets and other articles, a die-block, bottom piece therein, a plunger, a hand-lever, and intermediate mechanism for alternately operating the plunger and bottom piece by said hand-lever, and an indicating device to notify the operator when the bottom piece is in its lowermost position, that the recess in said die-block may be filled, substantially as described.

In testimony whereof we have signed our names to this specification in the presence of two subscribing witnesses.

CLARENCE W. FOX.
JOHN G. BLOUNT.
BERNICE J. NOYES.

Witnesses:
C. B. CROCKER,
D. E. PARKER.